United States Patent [19]

Bloom et al.

[11] 4,262,328

[45] Apr. 14, 1981

[54] DC-TO-DC CONVERTER

[75] Inventors: Gordon E. Bloom, Westlake Village; Altan Eris, Agoura, both of Calif.

[73] Assignee: Litton Systems, Inc., Beverly Hills, Calif.

[21] Appl. No.: 63,226

[22] Filed: Aug. 3, 1979

[51] Int. Cl.³ .......................................... H02M 3/335
[52] U.S. Cl. ...................................... 363/16; 363/39; 333/181; 307/105
[58] Field of Search .................................. 363/15–16, 363/20–21, 39–40, 106, 110, 131, 140; 323/8, 17, DIG. 1; 307/98, 105; 333/175–178, 181

[56] References Cited

U.S. PATENT DOCUMENTS

| 1,920,948 | 8/1933 | Crouse | 333/181 |
| 3,599,077 | 8/1971 | Lohrmann | 363/131 |
| 4,184,197 | 1/1980 | Ćuk et al. | 363/40 X |

Primary Examiner—William M. Shoop
Assistant Examiner—Peter S. Wong
Attorney, Agent, or Firm—Roy L. Brown; Harold E. Gillmann

[57] ABSTRACT

A DC-to-DC Converter using four tightly coupled transformer windings, two energy transfer capacitors, and a pair of switching devices connected to remove the ripple from both the input and output current circuits. The switching devices are driven in response to a switching signal.

9 Claims, 6 Drawing Figures $L'_{02} = L_{02} + L_{06}$ $L'_{03} = L_{03} + L_{08}$ $V_\ell \cong V_{16}$     $V_0 \cong V_{24}$

DC-TO-DC CONVERTER

FIELD OF THE INVENTION

This invention pertains to switching circuits, and particularly to electronic switching circuits which are adapted to increase or decrease a DC voltage without producing ripple currents in either the input or output connections to the circuit.

BACKGROUND OF THE INVENTION

The apparatus of this invention is an improvement in the circuits conceived by Slobodan Cuk, et al., as described, for example, in *Electronic Design News*, May 20, 1979, on pages 54, et. seq.

A description of the prior art may also be found in "A New Optimum Topology Switching DC-to-DC Converter" by Slobodan Cuk and R. D. Middlebrook in *IEEE Power Electronics Specialists Conference 77 Record*, (PESC) on pages 160, et. seq.

Still further description of the prior art may be found in "Coupled-Inductor and Other Extensions of a New Optimum Topology Switching DC-to-DC Converter" by Slobodan Cuk and R. D. Middlebrook in *IAS 77 Annual*, pages 1110, et seq.

The authors of those papers refer to U.S. patent application Ser. No. 837,532, now U.S. Pat. No. 4,184,197, the subject matter of which is unknown to the inventors of this invention.

Cuk, et al., have described a circuit which either produces a zero ripple output current or a zero ripple input current, but not both. See "Switching DC-to-DC Converter with Zero Input Or Output Current Ripple" by S. Cuk, *Proceedings of IEEE* Industry Applications Society Annual Meeting, Toronto, Canada, Oct. 1–5, 1978.

The Cuk apparatus utilizes a pair of tightly coupled windings wherein the inductances may either be adjusted to cause the output current to be ripple free or to cause the input current to be ripple free. Typically the Cuk apparatus has the two closely coupled windings in series connection with an energy transfer capacitor between them. The two sides of the capacitor are alternately grounded, and the careful adjustment of inductance values and coupling coefficient causes the current through the load or the input current to be substantially ripple free.

BRIEF DESCRIPTION OF THE INVENTION

The apparatus of this invention starts from the Cuk apparatus by first replacing the series capacitor by two series capacitors and connecting the junction between the capacitors through two parallel inductors to ground. The two series inductors and the two parallel inductors are preferably closely coupled by winding them on the same core. The windings are of a polarity such that instantaneous voltages across the four windings are in phase.

By proper choice of the inductances and coupling coefficients of the four windings, both the input and output currents may be made substantially ripple free.

Two additional non-coupled inductors may be placed in series with the two parallel windings, respectively, and the inductance of those non-coupled windings may be adjusted further to diminish the current ripple in both input and output circuits.

It is therefore an object of this invention to diminish the ripple current in the input and output circuits of a DC-to-DC converter.

It is also an object of this invention to provide a DC-to-DC converter having a minimum ripple current in both its input and output circuits.

BRIEF DESCRIPTION OF THE DRAWINGS

Other objects will become apparent from the following description, taken together with the accompanying drawings, in which.

DETAILED DESCRIPTION OF THE INVENTION

Figure 1:
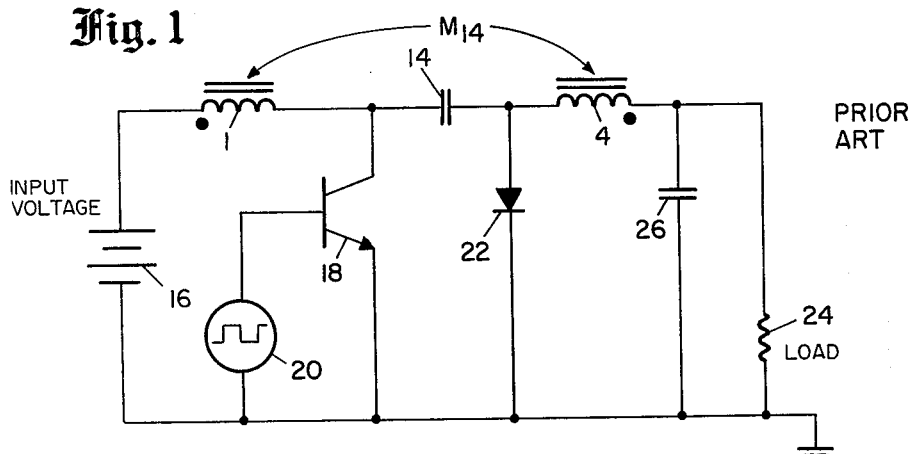
FIG. 1 is a schematic diagram of a prior art circuit.

A typical prior art apparatus according to S. Cuk is shown in FIG. 1. The circuit may be adjusted either to reduce the ripple current in the output circuit to zero or to reduce the ripple current in the input circuit to zero, but it may not be adjusted to reduce the ripple current to zero simultaneously in both the input and output circuits.

The input voltage source 16 is connected in series with one winding 1 on a ferromagnetic core transformer. The winding 1 is magnetically coupled to a second winding 4 which is connected in series with the load 24. An optional smoothing condenser 26 may be connected across the load 24. The inductor 1 is shunted to the ground or common terminal 28 through the emitter-collector path of a transistor 18 whose conductance is controlled by a rectangular wave source 20 between the base of transistor 18 and the common terminal 28. The inductor 4 is shunted through the diode 22 to the common terminal 28. A coupling capacitor 14 is connected for energy transfer between the inductors 1 and 4.

When the transistor 18 is conducting, current flows from the input source 16 through the inductor winding 1 and the transistor 18 to the common terminal 28. The junction between capacitor 14 and winding 1 is substantially at the common terminal potential. When the transistor 18 opens, the anode of diode 22 becomes positive, and current flows through inductor 1, capacitor 14 and diode 22 charging capacitor 14. The junction between capacitor 14 and inductor 4 is substantially at the potential of the common terminal. Load current flows through inductor 4 and diode 22.

When transistor 18 again conducts to connect the junction of inductor 1 and capacitor 14 substantially to the potential of common terminal 28, the anode of diode 22 becomes negative relative to the common terminal 28, and diode 22 stops conducting. The negative voltage at the anode of diode 22 causes current to flow in the load 24, through inductor 4, through the condenser 14 and transistor 18 discharging capacitor 14. By specifying the turn ratio of the inductors 1 and 4 as well as the coefficient of coupling, either the input or output current ripple may be reduced to zero.

Figure 5:
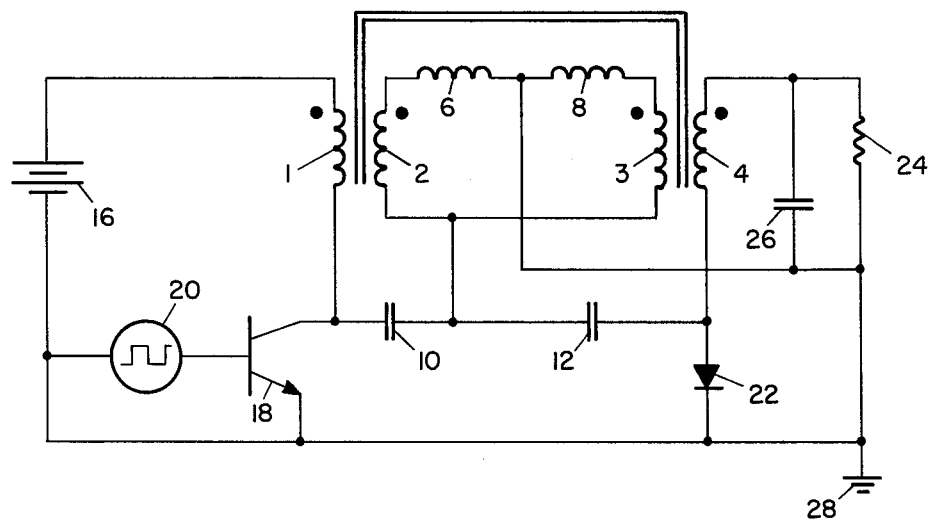
FIG. 5 is a schematic diagram of a preferred embodiment of the invention.
Figure 6A:
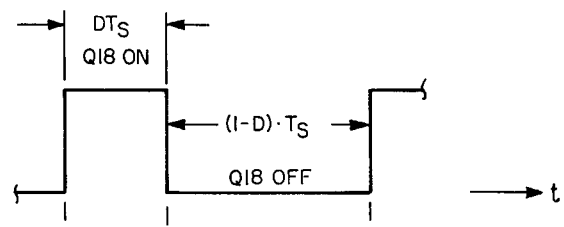
FIG. 6 is a diagram of idealized voltage waveforms for the apparatus of FIG. 5.
Figure 6B:
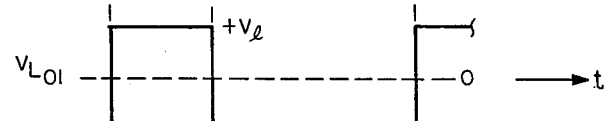
Figure 6C:
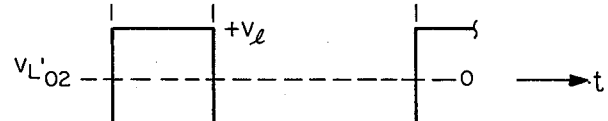
Figure 6D:
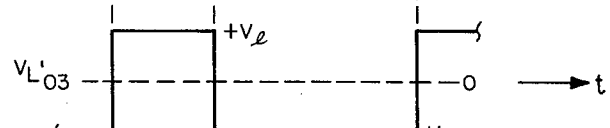
Figure 6E:
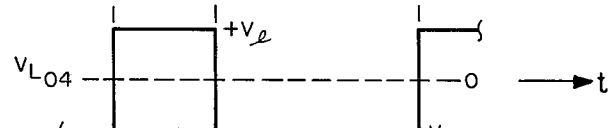

According to FIG. 5 on page 3 of the article "Switching DC-to-DC Converter With Zero Input or Output Current Ripple" by Slobodan Cuk in IEEE Industry Applications Society Annual Meeting Proceedings, Toronto, Canada Oct. 1–5, 1978, which is the same as FIG. 1 herein, when the coefficient of coupling between the inductors 1 and 4 equals the turn ratio between those inductors, the ripple in the output current becomes zero. When the coefficient of coupling between the inductors 1 and 4 equals the reciprocal of the turn ratio between those inductors, the input current ripple becomes zero.

Figure 2:
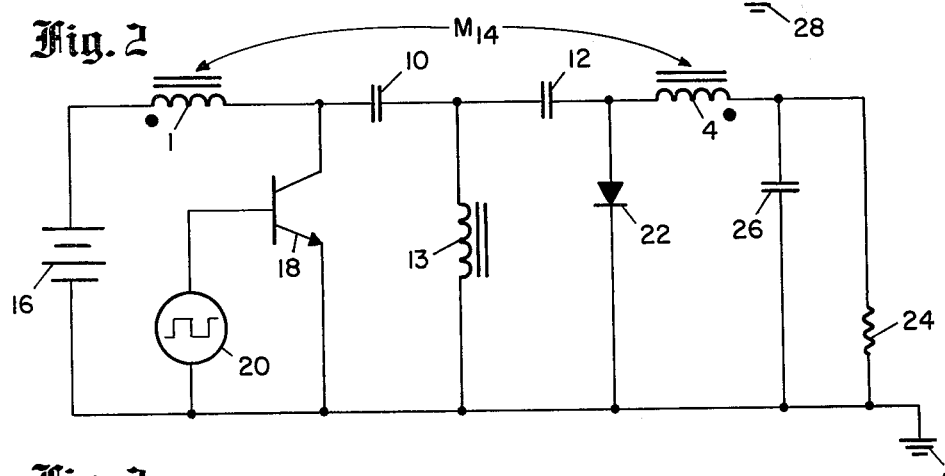
FIG. 2 is a schematic diagram showing the substitution of two series capacitors for the single series capacitor of FIG. 1, and the connection of the junction of those capacitors through a shunt inductor to DC ground.

In FIG. 2, the capacitor 14 has been replaced by two series connected capacitors 10 and 12. The shunt inductor 13 connects the center tap between capacitors 10, 12, to the common terminal 28.

Figure 3:
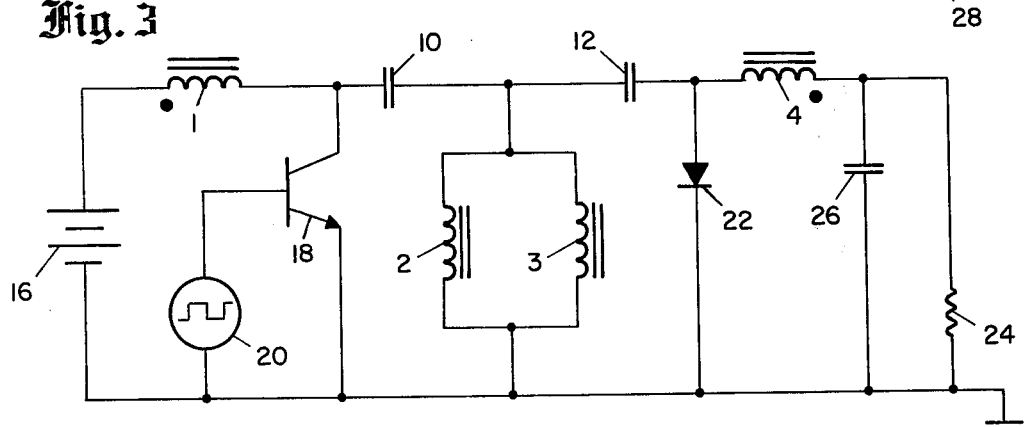
FIG. 3 is a schematic diagram showing the substitution of two parallel inductors for the single shunt inductor of FIG. 2.

In FIG. 3, the inductor 13 has been replaced by two parallel inductors 2 and 3.

Figure 4:
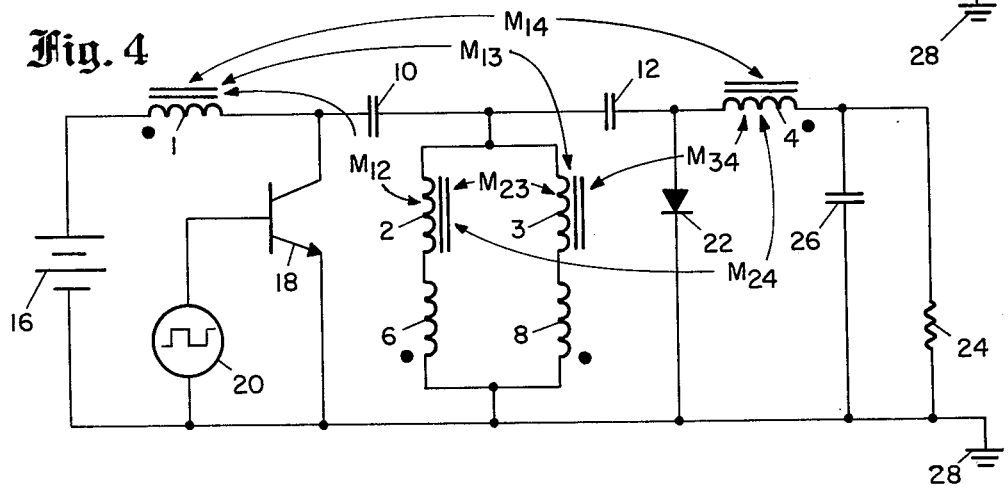
FIG. 4 is the circuit of FIG. 3 with the four inductors of FIG. 3 tightly coupled, and the use of two additional trimmer inductors each in series with a different shunt inductor of FIG. 3.

In FIG. 4, the two parallel inductors 2 and 3 are closely coupled to the other inductors 1 and 4. A pair of uncoupled trimming inductors 6 and 8 are connected in series with coupled inductors 2 and 3.

In the preferred embodiment of this invention, shown in FIG. 5, windings 1, 2, 3 and 4 are wound on the same ferromagnetic core, and they are closely coupled.

In FIG. 5, both the input current and the output current ripple are reduced to zero if the following three conditions are met:

$$\sqrt{\frac{L_{01}}{L'_{02}}} = \frac{1}{K_2'}$$

and $$\sqrt{\frac{L_{04}}{L'_{03}}} = \frac{1}{K_5'}$$

$$K_1 K_6 = K_3 K_4$$

where:

$$K_1 = \frac{M_{14}}{\sqrt{L_{01}L_{04}}}$$

$$K_3 = \frac{M_{13}}{\sqrt{L_{01}L_{03}}}$$

$$K_4 = \frac{M_{24}}{\sqrt{L_{02}L_{04}}}$$

$$K_6 = \frac{M_{23}}{\sqrt{L_{02}L_{03}}}$$

$$K_2' = \sqrt{\frac{L_{02}}{L'_{02}}} \times K_2$$

$$K_5' = \sqrt{\frac{L_{03}}{L'_{03}}} \times K_5$$

$$L'_{03} = L_{03} + L_{08}$$

$$L'_{02} = L_{02} + L_{06}$$

$$K_2 = \frac{M_{12}}{\sqrt{L_{01}L_{02}}}$$

$$K_5 = \frac{M_{34}}{\sqrt{L_{03}L_{04}}}$$

$M_{14}$ = Mutual inductance between inductors 1 and 4
$M_{13}$ = Mutual inductance between inductors 1 and 3
$M_{24}$ = Mutual inductance between inductors 2 and 4
$M_{23}$ = Mutual inductance between inductors 2 and 3
$M_{12}$ = Mutual inductance between inductors 1 and 2
$M_{34}$ = Mutual inductance between inductors 3 and 4
$L_{01}$ = self inductance of inductor 1
$L_{02}$ = self inductance of inductor 2
$L_{03}$ = self inductance of inductor 3
$L_{04}$ = self inductance of inductor 4
$L_{06}$ = self inductance of inductor 6
$L_{08}$ = self inductance of inductor 8

The tight coupling between the windings 1, 2, 3, 4 produces, by induction, cancelling voltages across the inductors as shown in FIGS. 6(a) through 6(e) thereby allowing changes in current to be zero.

Transistor 18 is shown as a NPN type polarized transistor. It may be any kind of switching element which operates rapidly enough to follow the square wave input of signal supply 20. For example, it may be a PNP transistor, an FET type transistor, a silicon controlled rectifier, a mechanical switch, a vacuum tube, a gas tube or other type switching device.

Similarly, diode 22 may be replaced by other type switching devices including those recited above and PNP or NPN type transistors.

The switching circuitry would need to be modified for use of other types of switches than those shown in the drawings. In some instances both switches would need to be synchronously controlled by the control source 20.

Since the DC biases in the inductor assembly are additive, the core of the windings 1,2,3,4, is selected to prevent saturization of the ferromagnetic material. Typically, and particularly at high frequencies, a ferrite might be used for the core.

The amplitude of the output voltage is determined by the duty cycle of the square wave as shown in FIGS. 6(a) through 6(e). The larger the duty cycle "D", the higher the output voltage as expressed by equation:

$$V_{24} = -D/(1-D) \cdot \eta \cdot V_{16}$$

where:
V$_{24}$ is the output voltage
V$_{16}$ is the input voltage
D is the duty cycle shown in FIG. 6
$\eta$ is the efficiency of the circuit
$\eta = P_o/P_{in}$
P$_o$ = output power delivered to load 24
P$_{in}$ = input power delivered by source 16

Thus, the apparatus of this invention is a DC-to-DC converter which may be used to increase or decrease voltage amplitude without introducing ripple into either the input or output voltage.

Although the invention has been described above, it is not intended that the invention shall be limited by that description, but only in accordance with the accompanying claims.

What is claimed is:
1. A DC-to-DC converter having a first input terminal pair for receiving a DC source and a second output terminal pair for connecting a load thereto, inductively coupled and capacitively coupled together, first switching apparatus connected in a closed mode to deliver input current from said input terminal pair through a first inductor, second switching apparatus connected in a closed mode to deliver output current through a second inductor to said output terminal pair, apparatus for cycling said switching apparatus so that one is open when the other is closed, the improvement comprising:

said capacitive coupling comprising a pair of capacitors in series connection; and further comprising at least third and fourth inductors connected in parallel to the junction between said capacitors and inductively coupled to said first and second inductors.

2. Apparatus as recited in claim 1 in which one terminal of each of said input and output terminal pairs are connected together at a common terminal; and said first switching means comprising a transistor with its collector-emitter path connected between the junction of said first capacitor and said first inductor, and said common terminal;

said apparatus for cycling being connected between the base of said transistor and said common terminal;

said second switching apparatus comprising a diode connected between the junction of said second capacitor and said second inductor and said common terminal;

said third and fourth inductors being connected to said common terminal.

3. Apparatus as recited in claim 1 and further characterized by fifth and sixth inductors substantially uncoupled from said first, second, third and fourth inductors, and connected in series with said third and fourth inductors, respectively.

4. Apparatus as recited in claims 1, 2, or 3 in which said first, second, third and fourth inductors are windings upon a common ferromagnetic core.

5. Apparatus as recited in claim 4 in which the material of said common core is selected to prevent saturation thereof by DC biases.

6. Apparatus as recited in claim 4 in which said core is a ferrite core.

7. Apparatus as recited in claim 3 in which $$K_1 K_6 = K_3 K_4$$

$$\sqrt{\frac{L_{01}}{L'_{02}}} = \frac{1}{K_2'}$$

and $$\sqrt{\frac{L_{04}}{L'_{03}}} = \frac{1}{K_5'}$$

wherein:

$$K_1 = \frac{M_{14}}{\sqrt{L_{01}L_{04}}}$$

$$K_3 = \frac{M_{13}}{\sqrt{L_{01}L_{03}}}$$

$$K_4 = \frac{M_{24}}{\sqrt{L_{02}L_{04}}}$$

$$K_6 = \frac{M_{23}}{\sqrt{L_{02}L_{03}}}$$

$$K_2' = \sqrt{\frac{L_{02}}{L'_{02}}} \times K_2$$

$$K_5' = \sqrt{\frac{L_{03}}{L'_{03}}} \times K_5$$

$$L'_{03} = L_{03} + L_{08}$$
$$L'_{02} = L_{02} + L_{06}$$

-continued $$K_2 = \frac{M_{12}}{\sqrt{L_{01}L_{02}}}$$

$$K_5 = \frac{M_{34}}{\sqrt{L_{03}L_{04}}}$$

$M_{14}$ = Mutual inductance between inductors 1 and 4
$M_{13}$ = Mutual Inductance between inductors 1 and 3
$M_{24}$ = Mutual inductance between inductors 2 and 4
$M_{23}$ = Mutual inductance between inductors 2 and 3
$M_{12}$ = Mutual inductance between inductors 1 and 2
$M_{34}$ = Mutual inductance between inductors 3 and 4
$L_{01}$ = self inductance of inductor 1
$L_{02}$ = self inductance of inductor 2
$L_{03}$ = self inductance of inductor 3
$L_{04}$ = self inductance of inductor 4
$L_{06}$ = self inductance of inductor 6
$L_{08}$ = self inductance of inductor 8

8. Apparatus as recited in claim 3 in which said first, second, third and fourth inductors are windings upon a common ferromagnetic core of material which is selected to prevent saturation thereof by DC biases; and $$K_1 K_6 = K_3 K_4$$

$$\sqrt{\frac{L_{01}}{L'_{03}}} = \frac{1}{K_2'}$$

$$\sqrt{\frac{L_{04}}{L'_{03}}} = \frac{1}{K_5'}$$

wherein:

$$K_1 = \frac{M_{14}}{\sqrt{L_{01}L_{04}}}$$

$$K_3 = \frac{M_{13}}{\sqrt{L_{01}L_{03}}}$$

$$K_4 = \frac{M_{24}}{\sqrt{L_{02}L_{04}}}$$

$$K_6 \frac{M_{23}}{\sqrt{L_{02}L_{03}}}$$

$$K_2' = \sqrt{\frac{L_{02}}{L'_{02}}} \times K_2$$

$$K_5' = \sqrt{\frac{L_{03}}{L'_{03}}} \times K_5$$

$$L'_{03} = L_{03} + L_{08}$$
$$L'_{02} = L_{02} + L_{06}$$

$$K_2 = \frac{M_{12}}{\sqrt{L_{01}L_{02}}}$$

$$K_5 = \frac{M_{34}}{\sqrt{L_{03}L_{04}}}$$

$M_{14}$ = Mutual Inductance between inductors 1 and 4
$M_{13}$ = Mutual Inductance between inductors 1 and 3
$M_{24}$ = Mutual inductance between inductors 2 and 4
$M_{23}$ = Mutual inductance between inductors 2 and 3
$M_{12}$ = Mutual inductance between inductors 2 and 2
$M_{34}$ = Mutual inductance between inductors 3 and 4
$L_{01}$ = self inductance of inductor 1
$L_{02}$ = self inductance of inductor 2
$L_{03}$ = self inductance of inductor 3
$L_{04}$ = self inductance of inductor 4
$L_{06}$ = self inductance of inductor 6
$L_{08}$ = self inductance of inductor 8

9. Apparatus as recited in claim 8 in which said core is a ferrite core.

* * * * *